(12) United States Patent
Ram et al.

(10) Patent No.: US 9,514,000 B2
(45) Date of Patent: Dec. 6, 2016

(54) BACKUP OF BASELINE INSTALLATION

(71) Applicant: Western Digital Technologies, Inc., Irvine, CA (US)

(72) Inventors: Tamir Ram, Sunnyvale, CA (US); William H. Evans, Menlo Park, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 312 days.

(21) Appl. No.: 14/246,706

(22) Filed: Apr. 7, 2014

(65) Prior Publication Data
US 2015/0220403 A1 Aug. 6, 2015

Related U.S. Application Data

(60) Provisional application No. 61/934,355, filed on Jan. 31, 2014.

(51) Int. Cl.
*G06F 11/14* (2006.01)
*H04L 29/08* (2006.01)

(52) U.S. Cl.
CPC ....... *G06F 11/1453* (2013.01); *G06F 11/1458* (2013.01); *H04L 67/1097* (2013.01)

(58) Field of Classification Search
CPC .............. G06F 11/1453; G06F 11/1458; H04L 67/1097
See application file for complete search history.

(56) References Cited

U.S. PATENT DOCUMENTS

| | | | |
|---|---|---|---|
| 6,499,054 B1 | 12/2002 | Hesselink et al. |
| 6,732,158 B1 | 5/2004 | Hesselink et al. |
| 7,120,692 B2 | 10/2006 | Hesselink et al. |
| 7,454,443 B2 | 11/2008 | Ram et al. |
| 7,467,187 B2 | 12/2008 | Hesselink et al. |
| 7,546,353 B2 | 6/2009 | Hesselink et al. |
| 7,587,467 B2 | 9/2009 | Hesselink et al. |
| 7,600,036 B2 | 10/2009 | Hesselink et al. |
| 7,788,404 B2 | 8/2010 | Hesselink et al. |
| 7,917,628 B2 | 3/2011 | Hesselink et al. |
| 7,934,251 B2 | 4/2011 | Hesselink et al. |

(Continued)

FOREIGN PATENT DOCUMENTS

| | | |
|---|---|---|
| WO | 2005022321 | 3/2005 |
| WO | 2010113167 | 10/2010 |
| WO | 2012030383 | 3/2012 |

OTHER PUBLICATIONS

International Search Report and Written Opinion dated Apr. 24, 2015 from related PCT Serial No. PCT/US2015/013534, 9 pages.

*Primary Examiner* — Michael C Lai
(74) *Attorney, Agent, or Firm* — Young Law Firm, P.C.

(57) ABSTRACT

A method of backing up a computing device comprises storing in the computing device, prior to any first backup of the computing device, a selected pre-populated Reference File that comprises one or more references to at least some of the data blocks stored in the computing device. A first backup may then be initiated. The first back may cause references to data blocks in the computing device that are unrepresented in the pre-populated Reference File to be added to the Reference File. The data blocks corresponding to the added references may then be sent to a backup server over a computer network.

18 Claims, 3 Drawing Sheets

(56) References Cited

U.S. PATENT DOCUMENTS

| | | |
|---|---|---|
| 8,004,791 B2 | 8/2011 | Szeremeta et al. |
| 8,209,540 B2 | 6/2012 | Brouwer et al. |
| 8,255,661 B2 | 8/2012 | Karr et al. |
| 8,285,965 B2 | 10/2012 | Karr et al. |
| 8,341,117 B2 | 12/2012 | Ram et al. |
| 8,341,275 B1 | 12/2012 | Hesselink et al. |
| 8,352,567 B2 | 1/2013 | Hesselink et al. |
| 8,458,131 B2 | 6/2013 | Bindal et al. |
| 8,526,798 B2 | 9/2013 | Hesselink |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |
| 9,009,429 B2 * | 4/2015 | Kapanipathi ......... G06F 3/0608 711/162 |
| 9,015,122 B2 * | 4/2015 | Harrison ............. G06F 17/3007 707/646 |
| 2005/0086241 A1 * | 4/2005 | Ram ................. G06F 17/30088 |
| 2005/0144195 A1 | 6/2005 | Hesselink et al. |
| 2005/0144200 A1 | 6/2005 | Hesselink et al. |
| 2007/0027937 A1 * | 2/2007 | McGrattan .......... G06F 11/1451 |
| 2008/0250085 A1 | 10/2008 | Gray et al. |
| 2009/0006640 A1 | 1/2009 | Brouwer et al. |
| 2010/0211983 A1 | 8/2010 | Chou |
| 2010/0250885 A1 | 9/2010 | Nakata |
| 2011/0213754 A1 | 9/2011 | Bindal et al. |
| 2012/0036041 A1 | 2/2012 | Hesselink |
| 2012/0089578 A1 * | 4/2012 | Lam ................. G06F 17/30159 707/692 |
| 2012/0109894 A1 * | 5/2012 | Kishi ................. G06F 11/1453 707/640 |
| 2012/0233417 A1 | 9/2012 | Kalach et al. |
| 2013/0212401 A1 | 8/2013 | Lin |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |
| 2015/0242428 A1 * | 8/2015 | Niles ....................... G03B 3/10 707/646 |

\* cited by examiner

BACKUP OF BASELINE INSTALLATION

CROSS-REFERENCE TO RELATED APPLICATIONS

This application claims benefit of U.S. Provisional Patent Application Ser. No. 61/934,355 entitled "BACKUP OF BASELINE INSTALLATION" filed on Jan. 31, 2014, the disclosure of which is incorporated by reference herein in its entirety.

BACKGROUND

As the growth of enterprise data accelerates, organizations struggle to find more efficient ways to manage this data. One emerging approach to controlling data growth is data deduplication. Data deduplication technologies are especially relevant to backups because, despite careful use of differential and incremental backup strategies, a large fraction of backups consists of duplicate data.

DETAILED DESCRIPTION

When a new computing device (including, without limitations, desktop computers, laptops, tablets, smart phones, servers, Network-Attached Storage (NAS), for example) is issued/sold, it typically has an operating system (e.g., Windows or Mac OS), and a number of applications. In this respect, newly-issued or sold computing devices may be very similar one to another. For example, in the enterprise market, a computing device newly-issued by the IT department may have an operating system such as Microsoft Windows, some database software, an email client and a productivity suite. As a lot of data is typically already stored on a new or newly-configured computing device, the initial full backup thereof is costly, both in terms of time and bandwidth.

Deduplication, also called "dedupe," removes duplicate information as data is stored, backed up, or archived. The dedupe process may be carried out at the file level, where duplicate files are replaced with a marker pointing to one copy of the file, and/or at the sub-file or byte level, where duplicate bytes of data are removed and replaced by references, resulting in a significant decrease in storage capacity requirements.

Data deduplication is a technology that reduces data volume by identifying and eliminating redundant data. Early technologies for single-instance storage, based on file-grain deduplication, have largely disappeared in favor of data block-based deduplication, in which files are represented as multiple blocks. Each data block of a file is compared to known data blocks. If a data block has been previously stored, the data block is simply referenced rather than stored again. Each data block, stored only once, may then be compressed using encoding technologies.

Figure 1:
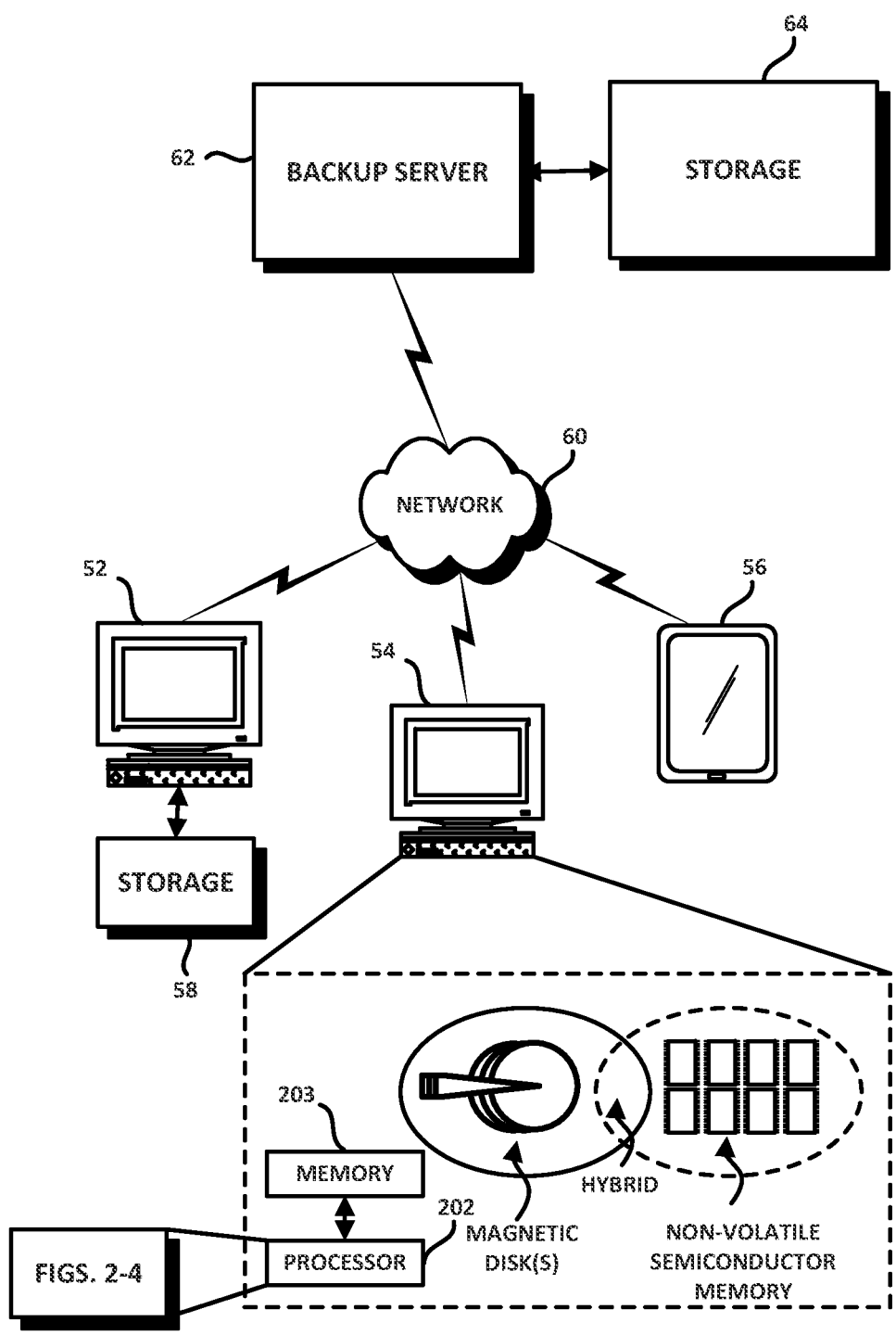
FIG. 1 is a block diagram of an environment in which embodiments may be practiced.

FIG. 1 is a block diagram of an exemplary environment in which embodiments may be practiced. As shown therein, a server (e.g., a backup server) 62 may be coupled or otherwise configured to access a network 60. The server 62 may be coupled to storage 64, either directly as shown in FIG. 1 or through the network 60. The storage 64 may comprise non-transitory, tangible storage including, for example, hard disk drives, solid state storage, or hybrid storage comprising both hard disk and solid state storage. The storage 64 may be configured, for example, as a Network Attached Storage (NAS), a Direct Attached Storage (DAC), a Redundant Array of Independent Disks (RAID) and/or may be differently configured. According to one embodiment, the storage 64 may be configured to store backups and the server 62 may be configured to process backups or otherwise carry out or embody the functionality described herein. A number of client computing devices are shown at 52, 54 and 56. The computing devices 52, 54 and 56 may be coupled to the backup server through the network 60. The computing devices 52, 54 and 56 may be configured, according to one embodiment, to send data blocks of data to be backed up to the backup server 62 for processing. One or more of the computing devices 52, 54 or 56 may be coupled to external storage, as shown at 58. The external storage 58 may be configured as NAS, DAC or RAID, for example, and may be directly coupled to a computing device or may be accessible by a computing device over the network 60. Any of the computing devices 52, 54 and 56 may also be configured to process backups or otherwise carry out or embody the functionality described herein. The computing devices 52, 54, 56 and/or the backup server 62 may comprise, for example, memory 203 in communication with a processor 202. The processor 202 may be coupled to storage that may comprise, for example, magnetic disks or other rotating media, non-volatile semiconductor memory or a hybrid thereof. The processor 202 may be configured, according to one embodiment, to execute sequences of instructions that implement the functionality and methods described and shown herein.

Figure 2:
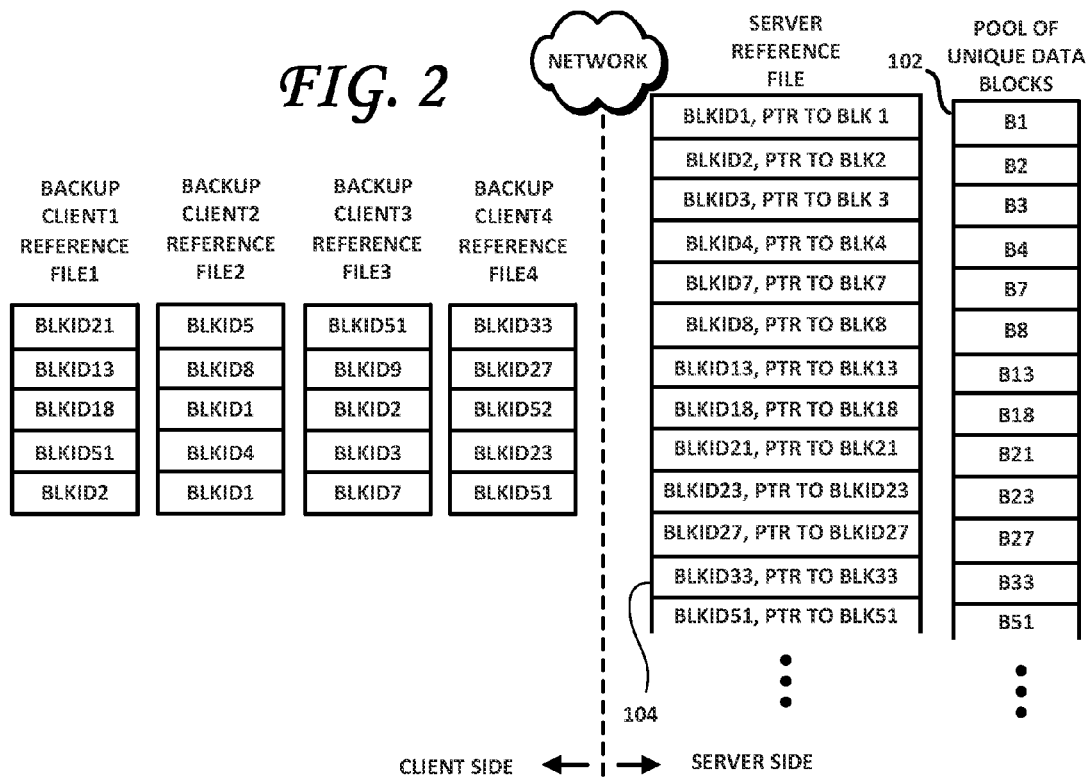
FIG. 2 is a block diagram illustrating aspects of one embodiment.

FIG. 2 is a block diagram illustrating aspects of one embodiment. As shown therein, each backup client (e.g., computing devices 52-56 in FIG. 1) may store or otherwise have access to a Reference File comprising references to data blocks. These data blocks may be stored, on the server side, in a pool of unique data blocks 102. According to one embodiment, these references comprise Block Identifiers (hereafter, BlockIDs). A Reference File, according to one embodiment, may comprise Block IDs (which may include, for example, the result of a complex polynomial and a hash value, e.g. MD5) and size. The unique Block IDs may be configured such that they are, as far as practicable, globally unique, in that there is a one-to-one relationship between an identifier and a unique data block. Data blocks that are identical, however, may be identified with the same block identifier. In one embodiment, a single BlockID, however, must never refer to two or more different data blocks. Rather than storing even a compressed version of the data as backups on the client or the server, embodiments store references (the Block IDs, in one embodiment) that reference separately-stored blocks in a Reference File stored on the backup client. A similar, but not identical Reference File may be stored on the server side, as shown at 102. For example and with reference to FIG. 2, a first backup client may store Reference File1, which may comprise references to blocks B21, B13, B18, B51 and B2. These blocks may not be stored in the client, but may be separately stored in the pool of unique data blocks 102, at the server side of FIG. 2.

The pool of unique data blocks 102 may be stored in a backup server or may be otherwise accessible to the backup server over a computer network.

For example, notice that a reference (BLKID2) to data block 2 is present in the Reference Files of both backup clients 1 and 3. The pool of unique blocks 102, however, need not store two instances of data block 2. Indeed, the pool of unique data blocks 102 may be configured to comprise a single instance of each unique block referenced by the references within the Reference Files. One or more of the blocks within the pool of unique data blocks 102 may be referred to once in the Reference Files and one or more of the blocks within the pool of unique data blocks 102 may be referenced or represented in more than one Reference File. For example, both Reference File1 and Reference File3, associated with backup clients1 and backup client 3, store a reference to block B2, a single instance of which is stored in the pool of unique data blocks 102. A single Reference File may be created and suitably updated at each backup client in the client side shown in FIG. 2. In this manner, Reference File1 may be associated with a first backup client, Reference File2 may be associated with a second backup client, Reference File3 may be associated with a third backup client and Reference File 4 may be associated with a fourth backup client, and so on.

The server side may also store or have access to a Reference File, as shown at 104. The Reference File 104 on the server side, however, may be configured somewhat differently than the Reference Files in each of the backup clients. While the Reference Files of each backup client may comprise a reference (e.g., BKLIDs) to each data block backed up, the server-side Reference File may be configured to comprise both the reference to the data block (e.g., the BLKID), but also a pointer or other reference to the location (e.g., offset) within the pool of unique data blocks 102 for each represented data block. The location of each data block within the pool of unique data blocks enables the backup server to readily retrieve data blocks from the pool of unique data blocks 102 at will.

According to one embodiment, the backup clients Reference Files and the server-side Reference Files may be kept synchronized, such that each BLKID in the backup clients' Reference Files has a corresponding entry in the server Reference File 104. If such is no longer the case, the backup client Reference File may be rebuilt by re-scanning the client computing device and re-generating the backup client Reference File.

Prior to assigning a computing device to a new employee, IT departments may equip the computing device with an operating system, one or more database applications, a browser, an email client and a productivity suite. New computing devices to be shipped to customers may also be similarly configured. This initial configuration may be scheduled for an initial back-up, either before the computing device is delivered to its intended recipient or afterwards. The initial backup of such computing device may be quite lengthy, as it is a full backup. Indeed, the initial backup may backup not only back up the operating system of the computing device, but also any files and programs supplied with the computing device, with the understanding that later backups will most likely be incremental backups that only backup data not previously represented in the first backup. This either delays the delivery of the computing device or places the responsibility for the first backup in the hands of the recipient of the computing device, which may not be optimal. Moreover, such initial, full backup may be quite resource-intensive (e.g., processor cycles, bandwidth and storage) and may degrade the performance of the computing device until the first backup is completed.

One embodiment pre-populates a backup Reference File with references to data blocks (e.g., BLKIDs in one embodiment), such that the pre-populated Reference File is identical or similar to the Reference File of one or more similarly-equipped computing devices. This pre-population of the backup Reference File saves time and bandwidth upon first backup. For example, during the first backup, the computing device can check the initial Reference File, determine that no or little data has changed, and backup only the additional data indicated by the Reference File. According to one embodiment, the Reference File need not be generated from scratch each time a computing device is pressed into service, as a suitable pre-populated Reference File (i.e., one whose references more or less accurately represent the data stored on the computing device) may already exist. That pre-populated Reference File may be selected amongst a plurality of pre-existing and pre-populated Reference Files.

Figure 3:
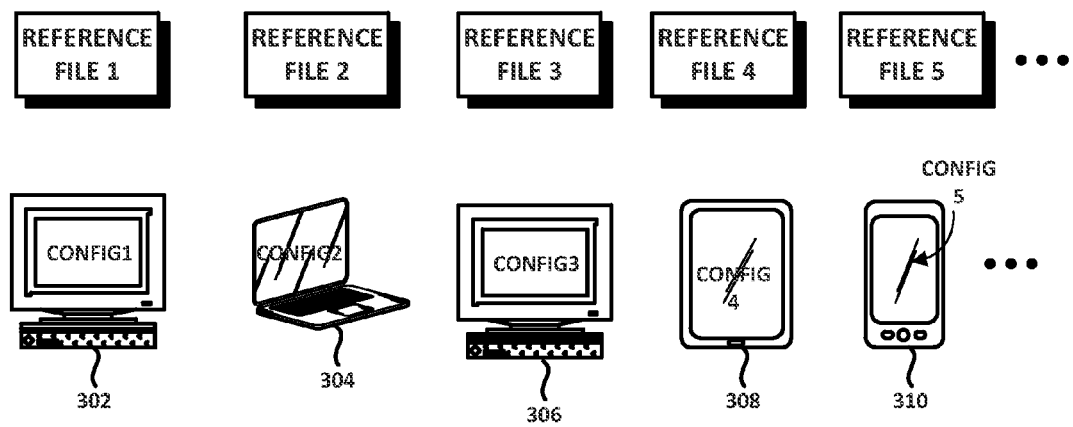
FIG. 3 is a block diagram that illustrates aspects of one embodiment.

FIG. 3 shows a plurality of computing devices and computing devices, each configured differently than the others. For example, computing device 304 may have some predetermined combination of operating system, applications and data stored thereon. This combination may have been chosen by the intended user of the computing device 304 and/or by, for example, an IT department of a company, depending upon the intended use of the computing device 304. For example, computing device 302 may be intended for a sales person and may, therefore, be preloaded with a sales territory tracking software, product specifications and a productivity suite of applications. Another computing device 306, while otherwise similar in specifications to the computing device 302, may be intended for an engineer. Computing device 306 may, therefore, be pre-loaded with modelling and design software and/or other data that would be pre-loaded on the computing device 302. Similarly, the purchaser of computing device 304 may have pre-selected a particular combination of operating system and applications that may not be present in other offerings of the computing device vendor. Mobile computing device 308 may each be differently configured. According to one embodiment, therefore, each of these computing devices 302-310 (or each of these types of computing devices 302-310) may, by virtue of their different configurations (labelled in FIG. 3 as CONFIG1, CONFIG2, CONFIG3, CONFIG4 and CONFIG5) may be associated with a separate, different and pre-existing Reference Files, shown in FIG. 3 as Reference File1, Reference File2, Reference File3, Reference File4 and Reference File5. Each of these Reference Files may, according to one embodiment, comprise references (e.g., BLKIDs) to chunks of data (called data blocks herein) stored in their respective computing device 302-310. These Reference Files may be stored in a backup server or may be otherwise accessible to the backup server. The data blocks identified by the references in the Reference Files may be stored in a pool of unique data blocks, as shown at 102 in FIG. 1.

Thereafter, when one of the computing devices 302-310 are purchased, delivered or otherwise put into use, the corresponding Reference File may be simply stored on the purchased computing device. As the Reference File in the newly-purchased computing device comprises references (e.g., BLKIDs) to at least some of the data stored in the computing device and as the pool of unique data blocks 102 already stores an exemplar of each data block referred to by the references in the pre-loaded Reference File, there is no need for an initial, full backup of the computing device, as such has already, in effect, been carried out. The act of creating, copying and storing the pre-populated Reference File, in effect, carries out the initial, full backup of the computing device without any data blocks having to be sent over the network to the pool of unique data blocks 102.

It is possible that the computing device stores some data that is not represented in the data blocks referred to by the references in the Reference File. In that case, however, the next backup may pick up that data in the form of one or more data blocks and suitably update the computing device's reference file with corresponding BLKIDs or other references to that data.

Thereafter, after the computing device is delivered to its intended recipient and/or when new data blocks are created, only references to new data blocks that are unrepresented by corresponding references (e.g., BLKIDs) in the pre-populated Reference File need be added to the pre-populated Reference File. The backup service may then check whether the Server Reference File 104 comprises a corresponding BLKID therein. If, the server Reference File 104 does, in fact, comprise an entry corresponding to the new block ID, the corresponding data block need not be transmitted to the backup server, as an exemplar of this data block is already present in the pool of unique data blocks 102. If, however, the backup service checks the server Reference File 104 and finds no corresponding reference to a new data block to be backed up, a reference to the new data block may be added to both the client-side computing device's Reference File and to the server-side Reference File 104, together with a pointer to the location in the pool of unique data blocks where such new data block may be found. Care may be taken, at every step, to ensure the integrity and synchronism between the Reference Files of the clients and the server Reference File. According to one embodiment, the pool of unique data blocks may be configured as a Universal Block Pool (UBP).

Because the initial configuration of many computing devices, both in the Enterprise space and in the consumer market, is very similar, machine to machine, the act of storing a selected and pre-populated Reference File in a backup client obviates the need for the otherwise-required initial, full backup. Therefore, the first backup of any such computing device or other processing device or machine is likely to be very similar to the first backup of any other identical or similar machine. Indeed, the same data blocks will be created as a result of the first scan and backup, the same Reference File will be constructed, and many of the same blocks will be sent to the server for storage for listing in the pool of unique data blocks. One embodiment, therefore, allows an approximation of an initial, full backup to be pre-stored on the computing device, in the form of a Reference File, without sending any data blocks to the pool of unique blocks 102 (or far fewer than would otherwise be the case). The first "real" backup thereafter only requires incremental changes to the pre-populated Reference File and the sending of a very limited number of previously unrepresented data blocks to the remote server. In fact, it is possible that one or more of the new data blocks created is identical to a data block that has already been backed up in the past. If the unique identifier of the newly-created data block is present in the server-side Reference File 104, then the corresponding data block need not be sent over the network to the pool of unique blocks 102, as an exemplar thereof is already present therein.

One embodiment, therefore, comprises selecting and/or pre-populating the Reference File in the computing device (e.g., the backup client), which pre-populated Reference File contains references to data blocks corresponding to, for example, the OS, applications and/or data files). Since the new machine is similar to other machines whose contents have already been backed up to the server, there is no need to transmit the scanned blocks of the new machine to the backup server, as such blocks are already there. There is no need to construct the Reference File, as other, similarly-constituted machines have already constructed a reference that serves acceptably well for this new machine in this instance. For example, if an IT department is directed to ready seven new computing devices having the same configuration as computing device 306 in FIG. 3, the IT department would select Reference File3 and each of these seven computing devices may be provided with a copy thereof, which Reference File3 effectively functions as the result of an initial, full backup, even though that initial, full backup was never, in fact, carried out. As Reference File3 has been previously created, the data blocks referenced by the constituent references thereof are already present in the pool of unique data blocks 102, thereby obviating the need to re-send them. Therefore, according to one embodiment, new machines may be provided with a selected and pre-populated Reference File which, in effect, means that the initial, full backup has already been done, without ever transmitting any data blocks to the remote storage server.

According to one embodiment, the pre-populated Reference File that is provided on the computing device may contain one or more references to blocks that are unrepresented on the computing device. This only marginally increases the size of the pre-populated Reference File and does not affect future incremental backups. In one embodiment, the one or more references are associated with programs or updates that are anticipated to be installed on the computing device so that when those programs or updates are installed in the future, the next backup operation is faster or even unnecessary. Similarly, the computing device may store data blocks that are unrepresented by corresponding references in the provided Reference File. Such differences in the references in the Reference File or in unrepresented data blocks on the computing device may be the result of small configuration differences from one similar computing device to the next. Any such differences may be ignored or picked up upon the first or any subsequent incremental backups.

As differences between similarly-constituted machines are likely to be small, and as any subsequent (first, real) backup is likely to be quite small, only the incremental changes (the delta between the data blocks of this particular machine and other similar machines) need be taken into account. That is, upon first backup, the pre-populated Reference File need be updated only with references to data blocks that are unrepresented in the pre-selected and pre-populated Reference File. The data blocks corresponding to those added references may then be sent to the server. Alternately, the first and subsequent backups may each create a separate version of the Reference File. The creation of a new Reference File does not require the underlying data blocks pointed to by the constituent references within the Reference File to be re-sent to the pool of unique data blocks, provided an exemplar thereof is already present therein. In this manner, it is only those data blocks that are unrepresented (by a corresponding BLKID, for example) in the selected and pre-populated Reference File that are added to the Reference File.

Accordingly, the degree of similarity between the computing devices from which the pre-populated Reference File or files were created and the computing device on which a first backup is carried out may drive the length of the first backup and the number of previously unrepresented blocks that are sent to the backup server for storage in the pool of unique data blocks. Very similar computing devices will finish their first backup very quickly, as the pre-populated Reference File may have contained references to all or almost all of the data blocks on the computing device. Computing devices that contain a greater number of blocks, the references to which are not in the pre-populated Reference File, may take a comparatively longer period of time to complete and may cause a comparatively greater number of blocks to be sent to the backup server for inclusion in the pool of unique blocks stored therein or accessible thereto. It is understood that the server Reference File is updated each time the pool of unique blocks is updated.

Should any client-side Reference File become corrupted, it may simply be reconstructed by re-scanning the computing device and re-populating a new Reference File. Alternatively, the pre-populated Reference File (a copy of which may have been kept in a secure location) may be used to pre-seed the backup process, thereby speeding up the re-construction of the corrupted Reference File. Such copy of the pre-populated reference file may be stored on the computing device itself, on removable media or downloaded from a network location, for example.

According to one embodiment, several pre-populated Reference Files may be prepared in advance, one for each "type" of new computing device/software combination or configuration and the appropriate references (e.g., pointers) may be pre-populated into the Reference File of each different "type" of machine/software combination. Storing the pre-existing and pre-populated Reference File in the computing device effectively carries out what would have been the initial, full backup of the computing device, without sending any data blocks of the computing device to the backup server. Significantly, this saves time and bandwidth upon first backup. Thereafter, the first backup of the computing device may be carried out after the computing device has been delivered to its intended user and data blocks not previously present on the computing device have been generated. This first backup is not an initial, full backup, as the initial, full backup has effectively been carried out by the storing of the pre-existing and pre-populated Reference File in the mass storage of the computing device. Indeed, this first backup may be an incremental backup that only backs up the differences between the similar reference machine/software combination (as represented by the selected pre-populated Reference File stored therein) and the new computing device/software combination and any new data blocks that may have been created after delivery of the computing device to its intended recipient and/or after use of the computing device. That amount of data and the resultant number of data blocks that need be sent to the backup server over the computer network during such first, incremental backup is likely very small, as most users only create a few MB of data each day. As a result, the first, incremental backup may be carried out faster than it otherwise might have been, had a full initial backup have been required. It is of note that embodiments may be implemented within the context of or in conjunction with the dedupe operations described above or entirely separate and independent thereof.

Figure 4:
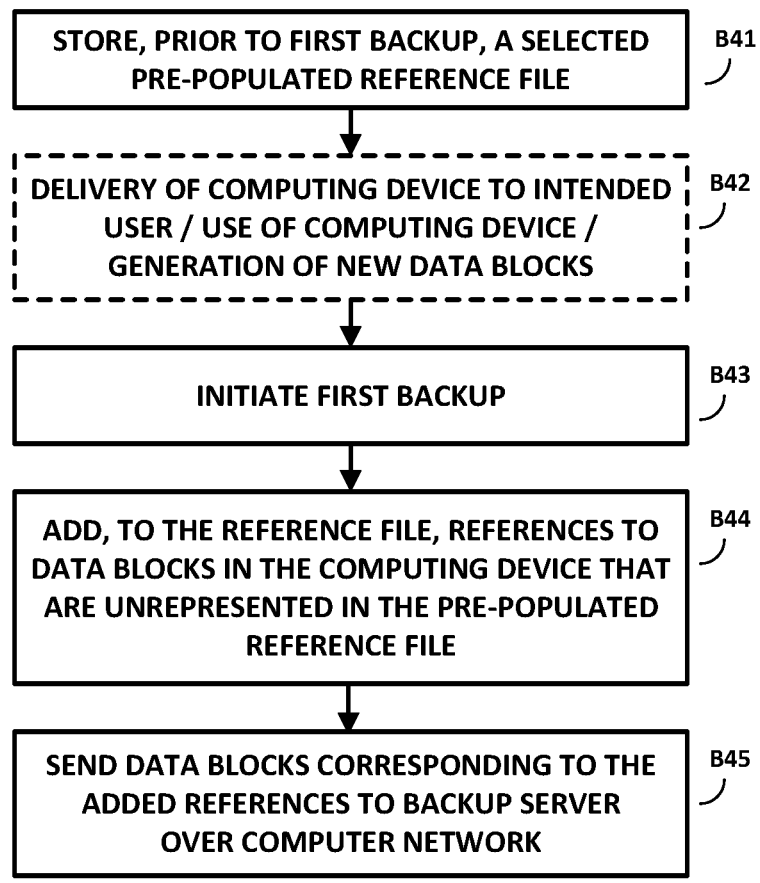
FIG. 4 is a flowchart of a method according to one embodiment.

FIG. 4 is a flowchart of a method according to one embodiment. As shown therein, a method of backing up a computing device comprising a plurality of data blocks may comprise, as shown at B41, storing in the computing device, prior to a first backup of the computing device, a selected pre-populated Reference File that comprises one or more references to at least some of the data blocks. Thereafter, the computing device may be delivered to its intended user, who may then use the computing device and generate new data that corresponds to new data blocks, as suggested at B42. At some later point in time, a first backup may be initiated, as shown at B43. This first backup may be initiated by, according to one embodiment and as shown at B44, adding, to the Reference File, references to data blocks in the computing device that are unrepresented in the pre-populated Reference File. Alternatively a new Reference File may be created, that comprises all of the references of the old Reference File and new references to any new or unrepresented data blocks. Before or after B44, previously unrepresented data blocks or data blocks corresponding to the added references may be sent to the backup server over a computer network, as shown at B45. A check may be carried out, to determine whether the server Reference File already contains an entry for the reference to the new data block. If so, according to one embodiment, it may not be necessary to send the data block for storage in the unique pool of data blocks, as that data block is already stored therein, as evidenced by its corresponding entry in the server Reference File.

According to one embodiment, the first backup is an incremental backup to back up only those data blocks to which a reference is not present in the selected pre-populated Reference File. As described above, such an incremental back may be initiated without an initial full backup being carried out. Indeed, prior to the first backup being initiated, the backup server comprises, stores or otherwise has access to a pool of unique data blocks or other store that comprises the data blocks referenced by one or more references in the selected pre-populated Reference File stored in the computing device. Effectively, storing the selected pre-populated Reference File backs up at least some of the data blocks of the computing device to the backup server without sending any of the data blocks of the computing device to the backup server over the network.

According to one embodiment, the pre-populated Reference File may be selected from a plurality of pre-existing and pre-populated Reference Files depending upon a configuration of the computing device. The one or more references to at least some of the data blocks comprise references to data blocks of, for example, an operating system, application programs and/or user or other data stored on the computing device. The first backup, in this manner, may add fewer references to data blocks of the computing device to the Reference File than are already present in the Reference File. Storing the selected pre-populated Reference File may advantageously be carried out prior to use of the computing device by the intended user thereof. Indeed, initiating the first backup of the computing device may be carried out after delivery of the computing device to its intended user, after data blocks not previously present in the computing device have been created in the computing device. During the first backup, according to one embodiment, only the data blocks corresponding to the added references may be sent to the backup server over the computer network.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure.

The invention claimed is:

1. A method of backing up a computing device comprising a plurality of data blocks, the method comprising:
storing in the computing device, prior to a first backup of the computing device, a selected pre-populated reference file that comprises one or more references to at least some of the data blocks, the selected pre-populated reference file being selected from a plurality of pre-existing and pre-populated reference files depending upon a configuration of the computing device; and
initiating the first backup of the computing device after additional data blocks have been created in the computing device, by:
adding, to the selected pre-populated reference file, references to data blocks in the computing device that are unrepresented in the selected pre-populated reference file; and
sending the data blocks corresponding to the added references to a backup server over a computer network,
wherein, prior to the first backup being initiated, the backup server comprises a pool of unique data blocks that comprises the data blocks referenced by the one or more references in the selected pre-populated reference file stored in the computing device.

2. The method of claim 1, wherein the first backup is an incremental backup to back up only those data blocks to which a reference is not present in the selected pre-populated reference file.

3. The method of claim 2, wherein the incremental backup is initiated without an initial full backup being performed.

4. The method of claim 1, wherein storing the selected pre-populated reference file backs up at least some of the data blocks of the computing device to the backup server without sending any of the data blocks of the computing device to the backup server over the computer network.

5. The method of claim 1, wherein the one or more references to at least some of the data blocks comprise references to data blocks of at least one of an operating system, an application program, and user data stored on the computing device.

6. The method of claim 1, wherein adding comprises adding fewer references to data blocks in the computing device to the selected pre-populated reference file than are already present in the selected pre-populated reference file.

7. The method of claim 1, wherein storing the selected pre-populated reference file is performed prior to use of the computing device by an intended user thereof.

8. The method of claim 1, wherein initiating the first backup of the computing device is performed after delivery of the computing device to an intended user thereof.

9. The method of claim 1, wherein sending comprises sending, during the first backup, only the data blocks corresponding to the added references to the backup server over the computer network.

10. A computing device comprising:
a plurality of data blocks;
mass storage; and
a processor connected to the mass storage, the processor being configured to:
store in the mass storage, prior to a first backup of the computing device, a selected pre-populated reference file that comprises one or more references to at least some of the data blocks, the selected pre-populated reference file being selected from a plurality of pre-existing and pre-populated reference files depending upon a configuration of the computing device; and
initiate the first backup of the computing device after additional data blocks have been created in the computing device, by:
adding, to the selected pre-populated reference file, references to data blocks in the computing device that are unrepresented in the selected pre-populated reference file; and
sending the data blocks corresponding to the added references to a backup server over a computer network,
wherein prior to the first backup being initiated, the backup server comprises a pool of unique data blocks comprising the data blocks referenced by the one or more references in the selected pre-populated reference file stored in the computing device.

11. The computing device of claim 10, wherein the first backup is an incremental backup to back up only those data blocks to which a reference is not present in the selected pre-populated reference file.

12. The computing device of claim 11, wherein the incremental backup is initiated without an initial full backup being performed.

13. The computing device of claim 10, wherein storing the selected pre-populated reference file backs up at least some of the data blocks of the computing device to the backup server without sending any of the data blocks of the computing device to the backup server over the computer network.

14. The computing device of claim 10, wherein the one or more references to at least some of the data blocks comprise references to data blocks of at least one of an operating system, an application program, and user data stored on the computing device.

15. The computing device of claim 10, wherein adding comprises adding fewer references to data blocks in the computing device to the selected pre-populated reference file than are already present in the selected pre-populated reference file.

16. The computing device of claim 10, wherein the processor is further configured to store the selected pre-populated reference file in the mass storage prior to use of the computing device by an intended user thereof.

17. The computing device of claim 10, wherein the processor is further configured to initiate the first backup of the computing device after use of the computing device by an intended user thereof.

18. The computing device of claim 10, wherein the processor is configured to send, during the first backup, only the data blocks corresponding to the added references to the backup server over the computer network.

* * * * *